United States Patent [19]

Riffiod

[11] Patent Number: 4,679,049
[45] Date of Patent: Jul. 7, 1987

[54] DELAY SIMULATOR FOR FM-CW RANGE MEASURING APPARATUS

[75] Inventor: Michel M. R. Riffiod, Fontenay Aux Roses, France

[73] Assignee: U.S. Philips Corporation, New York, N.Y.

[21] Appl. No.: 795,962

[22] Filed: Nov. 7, 1985

[30] Foreign Application Priority Data

Nov. 13, 1984 [FR] France .................... 84 17271

[51] Int. Cl.$^4$ .................................................. G01S 7/40
[52] U.S. Cl. .................................................. 342/172
[58] Field of Search ...................................... 343/17.7

[56] References Cited

U.S. PATENT DOCUMENTS 3,150,369  9/1964  Fontana .......................... 342/172
4,121,213  10/1978  Bush et al. ..................... 342/172
4,319,247  3/1982  Warren ........................ 342/172 X

FOREIGN PATENT DOCUMENTS 2163920  3/1986  United Kingdom ............. 342/172

*Primary Examiner*—T. H. Tubbesing
*Attorney, Agent, or Firm*—Robert J. Kraus

[57] ABSTRACT

An FM-CW range measuring apparatus (1) to be tested generates a beat signal Fb at the frequency fb between transmitted and received waves. A simulator connected to this apparatus comprises a signal processing link, including a first HF interrupter (6), a circulator (7) and a second HF interrupter (8). A delay line (11) operating in the reflecting mode for producing the delay $\tau$ is connected to an input-output of the circulator means for controlling the interrupters (26, 28, 29, 33) effect opening thereof at a frequency $f_r(f_r > 2b)$, the first interrupter being opened during $\delta$ ($\delta << 1/f_r$), and the second interrupter during $\delta'$ ($\delta' \approx \delta$). The phase shift $\tau'$ between $\delta$ and $\delta'$ is such that the durations $\delta$ and $\delta'$ are separated from each other and that at least an echo of the order p in the delay line is defined by the equation:

$$p \cdot \tau \approx f/f_r + \tau'$$

where k is a small integer.

4 Claims, 6 Drawing Figures

DELAY SIMULATOR FOR FM-CW RANGE MEASURING APPARATUS

BACKGROUND OF THE INVENTION

The invention relates to a delay simulator for FM-CW range measuring apparatus, such as for measuring altitude, or for a radar. The apparatus effects, during real time operation, a frequency comparison between the transmitted wave and the wave received after reflection from a target or retransmission by a responder in such manner as to generate a beat signal Fb of frequency fb. The simulator is intended for connection to the apparatus for testing its proper operation.

The invention relates to testing range measuring apparatus, more particularly to radio altimeters. By way of preferred example, the focus of interest will be for ranges which may vary from 0 to 16 kms (0 to 50,000 feet) and more, and which are to be measured by means of radio altimeters or FM-CW radar devices operating in a frequency band covering some hundreds of MHz and preferably being centered around several GHz, for example the 4.2 to 4.4 GHz band or centered around a lower frequency, for example on the order of 1 GHz. A radio altimeter of this type, utilizing other operating frequencies, is described in French Patent Specification No. 1,557,670 corresponding to U.S. Pat. No. 3,588,899. To put it more precisely, the wish is to be able to test the operation of a high altitude radio altimeter or of a FM-CW radar for ranges up to approximately 16,000 meters.

Before a radio altimeter is made operative, it is necessary to test it, more specifically to check its precision. In the known technique, delay lines of which the time delay $\tau_s$ is known very accurately are used for this purpose. Each delay line is representative of a simulated distance $D_s$ defined by the formula:

$$D_s = \frac{c \cdot \tau_s}{2} \quad (1)$$

c being the speed of an electromagnetic wave in the air. $D_s$ represents the distance the FM-CW apparatus must indicate with a very small error if it operates correctly, when the delay line producing the time delay $\tau_s$ is utilized. When a delay line is connected between the aerials of a radio altimeter, it delays the wave transmitted by the latter by a time $\tau_s$ and, for the radio altimeter, everything occurs as if the wave were transmitted in the air, reflected from an obstacle situated at a distance $D_s$ from the radio altimeter and received by the receiving aerial after the wave has returned through the same distance $D_s$. (In this comparison, as regards the wave, interest only goes towards the frequency functions as a function of time, it being assumed that the problems of attenuation of the signal between the transmitting and receiving aerials have been resolved). This method of testing a radio altimeter is very accurate but, because of price and bulk of the delay lines required, it is not possible to use an appropriate number for testing the precision at many altitudes (distances). Consequently, in practice this precision is only tested for some points, always the same, and there is a risk that only faults are detected which occur in a limited number of altitude zones. On the other hand, because of the above-mentioned price and bulk reasons, the tests are in practice only effected in a laboratory, whilst it would be desirable to have the possibility to use an air-borne test system.

SUMMARY OF THE INVENTION

An object of the invention is to provide an inexpensive and compact delay simulator for range measuring or FM-CW radar apparatus, which may be installed aboard an aircraft.

A further object of the invention is to provide a delay simulator capable of testing a range measuring or FM-CW radar apparatus in a plurality of, (preferably regularly spaced) simulated distances, possibly more than 10 different distances, and over a range of distances extending from 0 to more than 16,000 meters.

These objects are accomplished and the disadvantages of the prior art are obviated by means of applicant's invention. In accordance with the invention, the delay simulator comprises, arranged between a transmission portion and a receiving portion, a signal processing link constituted at least by a first interruptor for very high frequencies, a circulator and a second interrupter for very high frequencies. The simulator further comprises a delay line operating in the reflecting mode and characterized by a delay time of the wave, at a given frequency, equal to $\tau$ and connected via an input-output to an input-output of the circulator. Control means for the interrupters are provided such that they are opened at a frequency fr at least equal to 2fb, the first interrupter during a time interval $\delta$ which is distinctly less than 1/fr, and the second interrupter during a time interval $\delta'$ of the same order as $\delta$. The phase shift of the predetermined operation between the two interrupters corresponds to a controllable time interval $\tau'$ between the beginning of the time intervals $\delta$ and $\delta'$ and is such that the time intervals $\delta$ and $\delta'$ are separated and that at least an echo of the order of p of the delay line is defined by the equation:

$$p\tau = k/fr + \tau'$$

where k is a small integer.

A basic idea of the invention is to employ a delay line operating on the reflection and multi-echo principle. Such known lines are, for example, used by radar operators. A radar device can indeed detect several targets simultaneously, so that it is possible when a multi-echo delay line is interposed in the transmission-receiving portions of a radar, to test the latter for several simulated ranges $d_i$ in accordance with the formula $$d_i = \frac{c \cdot i \cdot \tau}{2} \quad (2)$$

c being the speed of light i being an integer which is representative of the order of the echo considered.

The multi-echo delay line is designed to ensure that the attenuation to which the wave is subjected after several round trips in the line is not too large, as otherwise the signal will be lost in the noise. It is, for example, possible to obtain delay lines of this type, producing echoes up to the order of 12 with an attenuation less than 130 dB. From this known prior art, a major problem occurs in adapting the delay line to a radio altimeter whose precision in measuring remote objects is to be tested. A radio altimeter is actually designed for detecting the nearest target, because of obvious security reasons, said target usually being the earth or a radio electric responder. The problem therefore is to accomplish the selection of any specific desired echo of the order i, which is representative of the distance $d_i$ to be tested in accordance with the above formula (2). To obtain a selection of a specific echo it is, for example, feasible to effect a frequency selection. In view of the fact that the wave transmitted by the FM-CW apparatus is given a sawtooth-shape, one might consider the use, downstream of the multi-echo delay line, of a bandpass filter whose passband is rather fine and controllable. However, filters which can be used in the very high frequency range are difficult to realize and such a mode of operation would require a very high precision and a high reliability of the equipment. The basic idea of the invention is to effect chopping of the wave transmitted by the FM-CW apparatus before sending it into the delay line. A second chopping operation after the delay and time shift relative to the transmission renders it possible to select the desired echo if the cut-off frequency is judiciously chosen. To choose the cut-off frequency and the cyclic ratio of the cutting operation, the following two constraints must be taken account of:

the cut-off frequency must be higher than twice the beat frequency $f_b$ of the radio altimeter, to satisfy the sampling principle;

the cyclic ratio and the cut-off frequency must be chosen such that the desired echo can be separated in time relative to the other echoes.

In this respect, according to the invention, an advantageous embodiment of the delay simulator according to the invention which permits the non-simultaneous simulation of several delays, is characterized in that for operating frequencies of the delay line on the order of 1 GHz this delay line transmits a number of identifiable echoes not more than equal to n, which makes it possible to simulate not more than n different delays separated by $\tau$ or a multiple of $\tau$, and in that the following relations are satisfied:

$$f_r = \frac{k \pm \frac{u}{n+1}}{\tau}$$

$$\delta \leq \frac{\tau}{k(n+1) \pm u}$$

$$\tau' = \frac{\tau \cdot i}{k(n+1) + u}$$

in which relations:

k is an integral number such as $k/\tau > 2f_b$ u is an integer which divides n i is an integer which may assume the values 1, 2, 3, . . . , n for a given couple of values k and u.

Another technical problem may be encountered in adapting a multi-echo delay line which operates on the reflection principle during testing the precision, at remote distances, of a radio altimeter, for the most frequent case in which the latter operates at a frequency higher than 1 GHz, for example at a frequency between 4.2 GHz and 4.4 GHz. A preferred delay line for putting the invention into effect is made of corundum, which material has an attenuation which significantly increases with frequency and it would not be possible to obtain desired echoes at a frequency on the order of 4 GHz. In contradistinction thereto, in view of the fact that the passband of such a delay line near 1 GHz remains sufficiently important, it is possible to delay the wave transmitted around 4 GHz by means of a double change in frequency, which remains compatible with the above-mentioned basic idea of the invention.

In these circumstances a delay simulator for range measuring apparatus operating at a frequency fe of several GHz and which is compatible with the above, is characterized in that the delay line operates at the intermediate frequency $f_i$ on the order of 1 GHz and that for this purpose first and second mixers for very high frequencies are interposed in the signal processing link between the first interrupter and the circulator, and between the circulator and the second interrupter, respectively, the first mixer receiving subtractively a signal Fos originating from an oscillator a frequency fos such that: $fe - fos = fi$ and the second mixer receiving additively the signal Fos originating from the oscillator in such manner as to recover at its output a signal having the frequency: $fi + fos = fe$.

BRIEF DESCRIPTION OF THE DRAWING

The following description, which is given by way of nonlimitative example with reference to the accompanying drawing figures, will make it better understood how the invention can be put into effect:

FIG. 3 is a time diagram similar to that of FIG. 2, showing an advantageous chopping of the wave for the embodiments of the FIGS. 1 and 4.

FIG. 4 is a circuit diagram of a second embodiment according to the invention.

DESCRIPTION OF THE PREFERRED EMBODIMENTS

Figure 1:
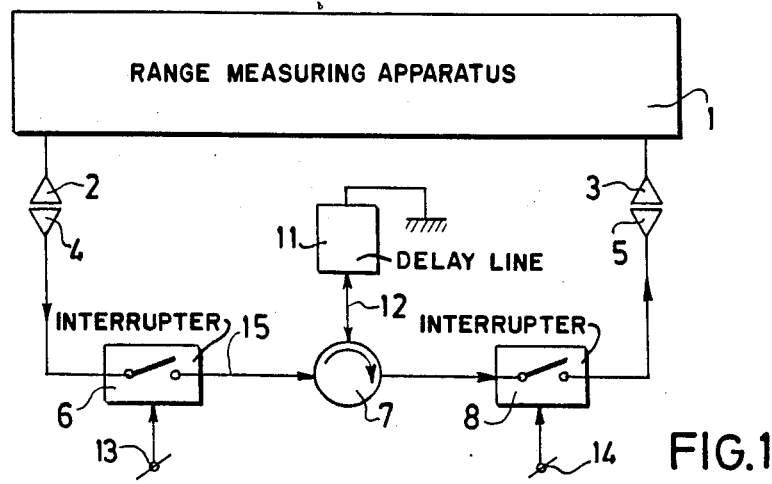
FIG. 1 is a simplified circuit diagram of a first embodiment according to the invention.

FIG. 1 shows a range measuring apparatus 1, for example an apparatus for measuring altitudes or a FM-CW radar. This apparatus transmits via transmission means 2, constituted by a transmitting aerial and/or a coaxial connector, an asymmetrical continuous sawtooth signal F having peak separations determined by a variable frequency of repetition f. Preferably, the frequency variations of the sawtooth, $\Delta F$, is kept constant. By way of specific example, let it be assumed that the value of $\Delta F$ is 200 MHz and that the frequency f is higher than 1 GHz. The frequency f varies, for example, between 1.2 and 1.4 GHz or between 4.2 and 4.4 GHz. In actual operation, the wave transmitted by the aerial 2 travels through a distance D, is reflected from an obstacle or is recoveyed after amplification by a responder, and is received in the form of a signal F' of frequency f' by the receiving aerial 3 of the radio altimeter, with a time shift equal to $\tau_1$ relative to the transmitted wave F. The time $\tau_1$ is equal to:

$$\tau_1 = 2D/c \tag{3}$$

which results in:

$$D = (c \cdot \tau_1)/2 \tag{4}$$

In the FM-CW apparatus, the frequency fb, which represents the subtractive beat between the transmitted wave F and the received wave F' is also kept constant and is defined by the relation:

$$fb/\tau_1 = \Delta F/T \quad (5)$$

T being the duration of each frequency variation $\Delta F$. From the relations (4) and (5) it can be derived that:

$$D = (c \cdot T)/2\Delta F fb \quad (6)$$

From formula (6) it follows that, the parameters fb and $\Delta F$ being assumed to be known and kept, for example, constant, the distance D is proportional to T. Put differently, the time T constitutes a measurement of D.

According to the invention, with the object of remote testing of the FM-CW apparatus, the simulator shown in the lower portion of FIG. 1 is added to this apparatus. This simulator comprises, arranged between receiving and transmission means 4 and 5, respectively, a signal processing link constituted by the cascaded sequence of a first interruptor for very high frequencies 6, a circulator 7 and a second interruptor for very high frequencies 8.

A delay line 11 operating in the reflecting mode is connected to the circulator 7 via a conductor 12 arranged between the input-output of the delay line 11 and an input-output of the circulator 7. Control means, not shown, which act on the control terminals 13 and 14, respectively, enable opening and closing of the interruptors 6 and 8. As used in describing operation of the interrupters, the word "open" describes a condition where signal propagation through the respective interrupter is prevented, and the word "closed" describes a condition where signal propagation through the respective interrupter is allowed. The signal which results from the chopping operation effected by the interruptor 6, present on the conductor 15, is represented by a solid line in FIG. 2. It relates to a square-wave signal 16 having a frequency fr (period Tr), each pulse sample having a width $\delta$. The frequency fr is chosen higher than 2fb and preferably equal to 5 or 10fb, so as to correctly sample the signal transmitted by the FM-CW apparatus relative to the beat signal obtained after the return of the wave transmitted in the FM-CW apparatus, not only as regards its fundamental frequency fb but also as regards the first harmonics of fb. Moreover, the cyclic ratio of the signal on the conductor 15 is chosen to be rather low, for example of the order of 0.1 but in any case sufficiently high to ensure that the time interval $\delta$ is higher than the sum of the ascending and descending periods of the signal due to an appropriate operation of the interruptor 6, this sum being of the order on some nanoseconds to some dozens of nanoseconds. By way of example, for use in the digital mode the following values are chosen: fb = 100 kHz; fr = 991.66 kHz; $\delta$ = 84 ns.

Figure 2:
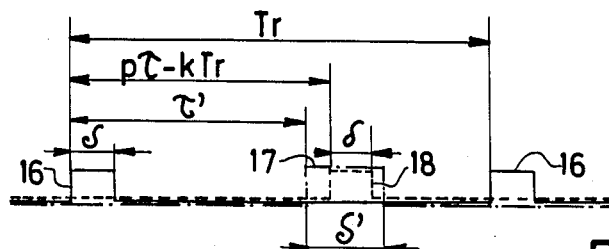
FIG. 2 is a time diagram of three signals on the basis of which the basic function of the simulator according to the invention can be explained.

After having been chopped, the transmission signal is transmitted to the circulator 7 and thereafter, via the conductor 12, to the delay line 11. This is a bulk wave delay line operating in the reflecting mode and is preferably made of corundum. In such lines the attenuation increases with frequency, so that for operating frequencies of several GHz only the first echo is identifiable at the output, the echoes of a much higher order being drowned in the noise. In contradistinction thereto, at a frequency on the order of 1 GHz it is possible to realize delay lines of the above type whose ten or fifteen first echoes remain below an attenuation threshold higher than the noise, i.e. an attenuation rate between approximately 80 dB and 130 dB. After simple or multiple reflection at 11, the chopped signal returns as an echo, via the conductor 12, to the circulator 7, which transmits it to the second interruptor 8, and is transmitted to the receiving portion 5 provided the interruptor 8 is closed at that instant. FIG. 2 shows this operation in the superposition mode with respect to the chopped signal 16. The time interval 17 of duration $\delta'$ during which the interruptor 8 is open, is represented by means of a dot-and-dash line, this time interval comprising the instant of duration during which the echo 18, represented by means of a broken line and which one wants to select, appears. It should be noted that if $\tau$ is the time required by the wave to travel through the delay line 11 and back and p is the order of the echo 18 to be selected, the echo 18 appears a period of time $p\tau$ after it has been transmitted. In addition to the constraints already mentioned in the foregoing for Tr and $\delta$, it is ensured that the echo 18 (or the echoes such as 18) appear between two pulses 16. Generally, the time $p\tau$ exceeds the time Tr without this being a necessity. In both cases, the echo of the order p denoted by 18 in FIG. 2 appears with a constant shift in time between two consecutive pulses of the signal 16 and the duration, less than Tr, which separates an echo 18 from the just preceding pulse of the signal 16 may be denoted by: $p\tau - kTr$, k being an integer which may assume the value 0 in the specific case in which the pulse of the just preceding signal 16 gives rise to the echo 18. Knowing the accurate values of $\tau$ and Tr and the order p of the echo one wants to select, it is possible to determine the duration $p\tau - kTr$. In order to select the echo of the order p it is therefore theoretically necessary to give the interruptor 8 an operating sequence identical to that of the interruptor 6 with a delay equal to $p\tau$, modulo Tr, relative to the latter. In practice, because it is difficult to achieve such an accuracy, a delay $\tau'$ is chosen for the control of the second interruptor relative to the first delay which is less than $p\tau - kTr$ and an open time interval $\delta'$ exceeding $\delta$ as shown in FIG. 2, such that a short time interval which constitutes a margin of inaccuracy, will be established on both sides of the echo 18, i.e. a short time lead before opening and a small time lag after closing. As will be obvious from the following description with reference to FIGS. 3 and 5, controlling the interruptors 6 and 8 must be effected with the precision of a quartz oscillator. In addition to the constraints mentioned above for the values to be respected for Tr and $\delta$, selecting the echo of the order p which is representative of the simulated distance $d_p$ in accordance with formula (2) is possible when the following conditions are satisfied:

$$Tr - \delta > p \cdot \tau - k \cdot Tr > \delta \quad (7)$$

For the selection of an other echo of the order q, conditions similar to the conditions (7) must be satisfied, namely:

$$Tr' - \delta_1 > q \cdot \delta - k' \cdot Tr' > \delta_1$$

where Tr' complies with the above-defined sampling principle. It may happen that the values Tr and $\delta$ are also appropriate for the echo of the order q but for all cases, that is to say when the values of Tr and $\delta$ are preserved or not preserved for the different identifiable echoes whose number at respective orders are known, given the delay line type used and the frequency of the wave transmitted by the FM-CW apparatus, measures must be taken to ensure that there is no echo superpositioning, which might occur, if, p and q being the respective orders of the two different identifiable echoes, a value Tr is chosen such that:

$$p\tau - k \cdot Tr \simeq q \cdot \tau - k' \cdot Tr, \text{ so: } (p-q)\tau \simeq (k-k')Tr$$

Consequently the above described embodiment of the invention applies to a number n weak identifiable echoes, that is to say echoes which are preferably less than 10.

With the object of rendering the above-described selection of the echoes less empirical, a second embodiment of the invention will now be described with reference to FIG. 3. It should be noted, that, to avoid superpositioning of the echoes themselves or superpositioning of an echo and the transmitted pulse, it is sufficient to satisfy, for example, the following relations $$\tau - k \cdot Tr = \delta \quad (8)$$

$$Tr = (n+1)\delta \quad (9)$$

wherein n is the order of the highest identifiable echo and, preferably, also represents the number of identifiable echoes, the latter indicating that all the echoes, from 1 up to n are identifiable.

By combining the relations (8) and (9), it is obtained that:

$$\frac{1}{Tr} = fr = \frac{k + \frac{1}{n+1}}{\tau} \quad (10)$$

A suitable range of values having been determined for fr and moreover knowing the values of $\tau$ and n, it is possible to determine, on the basis of relation (10), several possible values for k denoted $k_1, k_2, k_3, \ldots$ corresponding to a similar number of values $fr_1(Tr_1)$, $fr_2(Tr_2)$, $fr_3(Tr_3), \ldots$ The corresponding possible values of $\delta$ are themselves obtained by employing formula (9). It will be noted that the choice of one single value for k, denoted kj, which is determined by the values frj, Trj, $\delta$j, is sufficient for putting the invention into effect. By eliminating Tr from the relations (8) and (9), $\delta$j may be written as:

$$\delta_j = \frac{\tau}{(n+1)k_j + 1} \quad (11)$$

In practice, with the object of regularly separating the echoes in the time, a value $\delta$ is chosen which is somewhat lower than $\delta$j and, for $\delta'$ a value is chosen comprised between $\delta$ and $\delta$j as is shown in FIG. 3, where it is assumed that six echoes of the respective orders 1°, 2°, 3°, 4°, 5°, 6° can be identified. To obtain the echo of the order i (where i can take the values 1, 2, ... n) it is therefore sufficient to give $\tau'$ the values: i. $\delta$j or $$\tau' = \frac{\tau \cdot i}{(n+1)kg + 1}$$

as the echoes appear consecutively and disjointed between two pulses of the signal 16 in accordance with a chronological sequence which is the same as the increasing sequence of their orders.

By way of variant, the following conditions may alternatively occur:

$$\frac{1}{Tr} = fr = \frac{k - \frac{1}{n+1}}{\tau} \quad (12)$$

$$Tr = (n+1)\delta \quad (9)$$

In this case the n identifiable echoes are obtained in accordance with the same configuration as that shown in FIG. 3, with the sole difference that their sequence is inverted with respect to the sequence shown in FIG. 3, that is to say in an achronological sequence. To obtain the echo of the order i it is then sufficient to give $\tau'$ the value $(n-i+1)\delta j$. It should be noted that, with respect to the preceding case, this is the same as taking somewhat higher values for Tr and consequently for $\delta$.

By way of example of a digital use the following values are, for example, chosen: fb = 100 kHz; $\tau$ = 10 μs; n = 12

The range of values chosen for fr is, for example 480 kHz < fr < 1.22 MHz

The possible values for k are, because of the relation (10) or the relation (12): $k_1=5$; $k_2=6$; $k_3=7$; $k_4=8$; $k_5=9$; $k_6=10$; $k_7=11$; $k_8=12$.

From these values the value $k_6=10$ is, for example, chosen, which is a good compromise between a rather high sampling frequency and a not too low value of $\delta$, which results in the following pairs of values $fr_6$, $\delta_6$:

for the echoes obtained in chronological order:
$fr_6 = 1.0077$ MHz
$\delta_6 = 76.3$ ns for the echoes obtained in accordance with an achronological order:
$fr_6 = 992.3$ kHz
$\delta_6 = 77.5$ ns The system is very sensitive to frequency variations. The above-calculated frequencies $fr_6$ must be obtained from, for example, a frequency synthesizer with the precision of a quartz oscillator of the order of $10^{-4}$ to $10^{-5}$. In contradistinction thereto, the values for $\delta$ and $\delta'$ are less critical and, in correspondence with the two abovecalculated values for $\delta_6$ the values $\delta = 70$ ns; $\delta' = 73$ ns can, for example, be chosen.

Other solutions in the form of conditions imposed on fr and $\delta$ are possible, which result in the timing diagrams of FIG. 3 where the echoes are separate from each other and also relative to the pulses 16, for which coding becomes necessary for establishing the correct agreement between one part of the given value at $\tau'$ which is equal to an integral number of times $\delta$j and on the other hand the order of the echo one wants to select. These other solutions consist in resolving equations of the type:

$$\tau = k_j \cdot Tr \pm u\delta \quad (13)$$

u being an integer less than n.

As a function of the given value of n, it may happen that certain values of u are not suitable for use in the equation (13) to obtain the result aimed at, that is to say disjointed pulses but, for example, equation (13) is applicable when n can be divided by u or, in the specific case where n=12, the values: 2, 3, 4, 6.

These solutions are not so advantageous as those described in the foregoing, in view of the fact that they require an additional encoding, but they have the advantage that they can adjust the value of fr to near a predetermined, desired frequency value. As a function of the equation (13), which generalizes them, the formulae (10) and (12) are converted into:

$$fr = \frac{1}{Tr} = \frac{kj \pm \frac{u}{n+1}}{\tau} \quad (14)$$

and formula (11) into:

$$\delta j = \frac{\tau}{(n+1)kj \pm u} \quad (15)$$

in which formulae n is dividable by u.

To go back to the aforementioned digital application, the possible frequencies $fr_6$ are, in addition to the two values already calculated in the foregoing for $u = \pm 1$: 953.84 kHz; 969.23 kHz; 976.92 kHz; 948.61 kHz; 1015.38 kHz; 1023.07 kHz; 1030.77 kHz; 1046.15 kHz. Each possible value kj consequently generates at least ten appropriate frequencies frj for the case in which n=12, which results in an accurate frequency fr, possibly every 10 kHz, on an average in the range of allowed frequencies, for example between 480 kHz and 1220 kHz.

In the foregoing, simulators according to the invention are described which are intended to operate at comparatively low frequencies, of the order of 1 GHz and which can select a number on echoes which may exceed 10, or also at much higher frequencies on the order of several GHz but likely to select in the latter case a limited number of echoes only, which limited number may be considered a low number for the range measurement test of the FM-CW apparatus. Now, the apparatuses to be tested generally operate at a frequency of several GHz with a frequency deviation on the order of some hundreds of MHz. By way of example, in the sequel a FM-CW apparatus will be described whose frequency fe is comprised between 4.2 and 4.4 GHz. In a manner which is compatible with the embodiments described in the foregoing it is possible to effect a change-over to an intermediate frequency for the circulator and the delay line and in doing so to make the optimum operating frequencies of the FM-CW apparatus and the optimum operating frequencies of the delay line independent and compatible as described below with reference to FIG. 4.

In FIG. 4, the components corresponding to those in FIG. 1 and having the same functions are given the same reference numerals. Certain details of the FM-CW apparatus 1, which is of a known type are shown. The apparatus 1 comprises transmission and receiving means 2 and 3, respectively, aerials or coaxial connectors, which are intended to cooperate with similar receiving and transmission means 4 and 5, respectively of the simulator. In the apparatus, a subtractive beat operation is effected in a mixer 20, for example a diode mixer, between a fraction of the transmitted wave taken from the transmission section by a coupler 21 and the received wave. Preferably in a known manner, an internal control keeps the frequency fb of the beat signal obtained at the output 22 of the mixer 20 constant. In this respect it should be noted that the signal received on the subtractive input of the mixer 20, originating from the receiving means 3 is a chopped signal of the same nature as the signal 16 on the conductor 15 of the simulator (it has the same frequency at the same cyclic chopping ratio). From this it follows that the signal at the output 22 of the mixer 20 is also a chopped signal of the same frequency and with the same cyclic ratio as the two aforementioned signals. From this last signal, a d.c. signal of the frequency fb is recovered by means of filtering in a known manner, not shown, within the FM-CW apparatus, preferably by means of a bandpass amplifier.

The change-over to the intermediate frequency is effected in the simulator of FIG. 4, by two mixers 23 and 24 arranged between the interruptors 6 and 8 on the one hand and the circulator 7, in this link the inputs of these mixers being additive inputs, and by an oscillator 25, preferably a quartz oscillator. The output signal Fos of the oscillator 25 has a frequency fos equal to the difference fe−fi between the carrier frequency of the signal transmitted by the FM-CW apparatus and the nominal frequency fi of the signal circulating in the delay line. The frequency fe varies, for example, linearly between 4.2 and 4.4 GHz and the frequency fi varies linearly between 1.2 and 1.4 GHz. In these circumstances, fos is equal to 3 GHz. It is thus possible, by changing the frequency twice, to delay the wave transmitted around 4.3 GHz.

Figure 5:
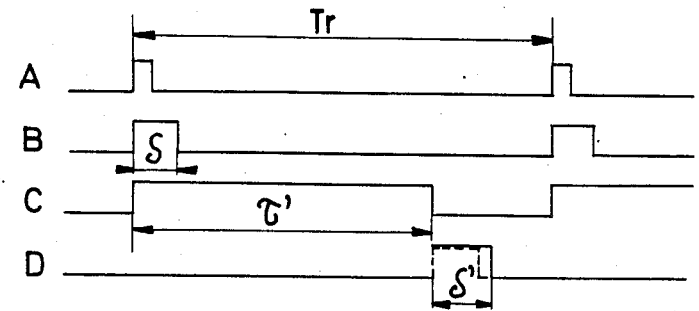
FIG. 5 is a time diagram of different signals present on the conductors of the diagram of FIG. 4.

FIG. 4 also shows, by way of example, control means connected to the control input terminals 13 and 14 of the interruptors 6 and 8. These means comprise a circuit formed by two monostable trigger circuits 26, which receives via a conductor 27 the output signal A of a frequency generator 28 and the output signal of a modulator 29 which varies the time interval $\tau'$. In the circuit 26 a first monostable trigger circuit which is triggered by the ascending edge receives the signal A of the frequency fr at the conductor 27. The output of the first monostable trigger circuit applies a signal B formed by pulses of the frequency fr and having a duration δ which is controlled within the monostable trigger circuit by a circuit RC to both the control terminal 13 of the first interruptor 6 and, via a conductor 31, to the input of a second monostable trigger circuit which is triggered by the ascending edge. The output of the second monostable trigger circuit applies, via a conductor 32, a signal C formed from pulses of the frequency fr and duration $\tau'$ to a third monostable trigger circuit 33 which is triggered at the descending edge which also forms part of the control means. The monostable 33 is controlled for a pulse duration δ' by a circuit RC, which results in a signal D formed from pulses of the frequencies fr and duration δ' applied by a conductor 34 to the control terminal 14. The shape of the signals A, B, C and D as a function of time at the respective conductors 27, 31, 32, 34 is shown in FIG. 5, which also shows, by means of a broken line, the duration of an identifiable echo within the closing sequence of the interruptor 8. The time $\tau'$ is also controlled in known manner by means of a circuit RC. To obtain a value of $\tau'$ equal to:

$$\frac{\tau \cdot i}{(n+1)kj \pm u}$$

it is, for example, possible to have the resistance value of the lastmentioned circuit RC to vary as a function of the value 1, 2, ... or n, chosen for i by using a resistor change-over switch with contacts, in the variator 29, which comprises i resistors denoted by $R_1, R_2, \ldots R_n$ each of these resistors making it possible to obtain, when this switch is connected into the circuit RC, one of the abovedefined values of $\tau'$. A further means for generating these durations $\tau'$ consists in the use of a counter, which is rendered possible by the fact that all the values of $\tau'$ are multiples of the elementary value:

$$\frac{\tau}{(n+1)kj \pm u}$$

The value of fr must be obtained with the precision of a quartz and the frequency generator 28 is preferably a frequency synthesizer. FIG. 4 also shows a filter 35 arranged between the interruptor 8 and the receiving means 5 of the simulator. This filter, which is not indispensable, is a bandpass filter which has for its function to eliminate a portion of the noise in the chopped echo signal. The passband of the filter 35 is the same as the frequency shift of the signal Fe, i.e., when referring to the above-indicated digital example, 4.2 GHz to 4.4 GHz.

By using a simulator in accordance with the circuit diagram of FIG. 4, including a delay line of the type F 5026 manufactured by Thomson, which produces a delay $\tau$ of 9.96 $\mu$s at 4.3 GHz, and applying the condition (12) where n=12 and k=10 and formula (2), it is possible to obtain in the laboratory for a cut-off frequency fr equal to 996.29 kHz the simulation of the following distances: 4900 feet, i.e. 1493 m with an attenuation of 86 dB produced by the simulator;

14,700 feet, i.e. 4480 m with an attenuation of 115 dB;
19,600 feet, i.e. 5974 m with an attenuation of 106 dB;
34,300 feet, i.e. 10454 m with an attenuation of 122 dB;
39,200 feet, i.e. 11948 m with an attenuation of 115 dB;
53,900 feet, i.e. 16428 m with an attenuation of 126 dB;

which corresponds to echoes of the order 1, 3, 4, 7, 8 and 11, respectively, the echoes of the orders 2, 5, 6, 9 and 10 being attenuated to such a large extent that they are not identifiable (an attenuation of less than 140 dB).

Figure 6:
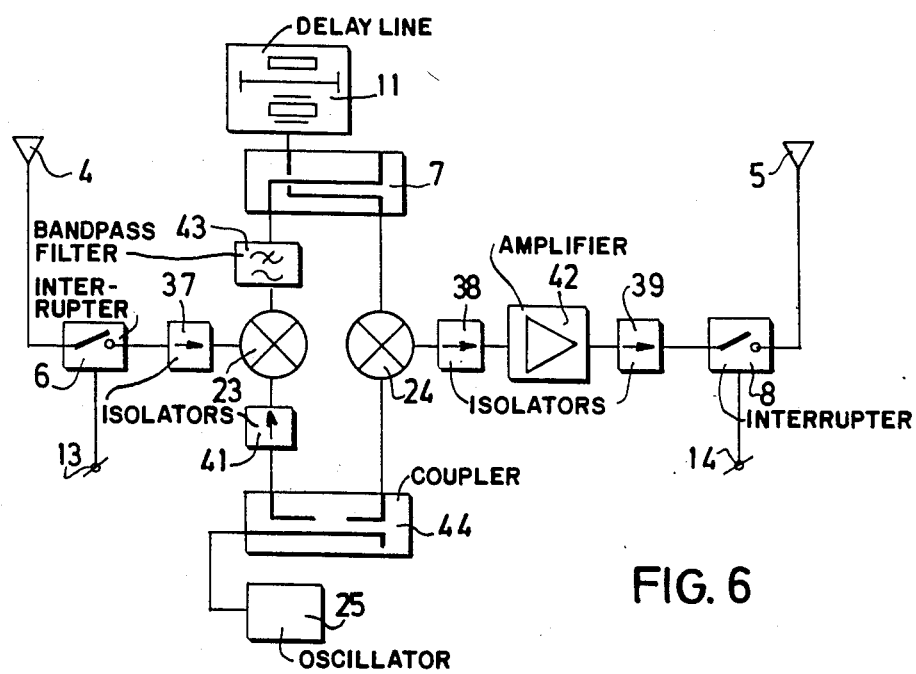
FIG. 6 is a detailed circuit diagram of the very high frequency portion for the embodiment of FIG. 4.

FIG. 6 shows, provided with the same reference numerals, the main components of the very high frequency portion of the simulator shown in FIG. 4. Some of these components are, for example, as follows:

6 and 8: SPDT PIN change-over switches produced by General Microwave, model F 8924
23 and 24: mixers produced by ANAREN, reference 43126
7: circulator realized by means of a 3 dB coupler, frequency 1.3 GHz±100 kHz produced by NARDA, type no. 40326
11: delay line, $\tau$=80 $\mu$s, produced by THOMSON, type no. F 5026
25: 3 GHz/250 mW oscillator, produced by TRT.

In addition to these components, four isolators 37, 38, 39, 41, and amplifier 42, a bandpass filter 43 and a coupler 44 are shown. The isolator 37 is arranged between the interruptor 6 and the mixer 23, the isolator 38 in the main link just downstream of the mixer 24, the isolator 39 is provided in the main link just upstream of the interruptor 8 and the isolator 41 just upstream of the second input of the mixer 23. The isolators 37 to 41 are, for example, 4.2 GHz to 4.4 GHz isolators produced by TRT, type no. 3511 180 22 761. The amplifier 42, arranged between the isolators 38 and 39 is, for example a 40 dB amplifier produced by AERCOM type No. AT 4229. The bandpass filter 43 provided just downstream of the mixer 23 is, for example, a filter having a cut-off frequency of 1.5 GHz and is produced by TRT. The signal Fos having a frequency fi of 3 GHz produced by the oscillator 25 is distributed in a subtractive manner and an additive manner, respectively, to the mixers 23 and 24, via the coupler 44, which is, for example, a 4 dB/3 GHz coupler produced by ANAREN, type no. 40266.

It should be noted that the delay lines produced by THOMSON used for the prototypes of the above-defined simulator are not particularly suitable for use in accordance with the invention. It is possible to produce delay lines for which all the echoes of the consecutive orders are identifiable, with an attenuation less than 100 dB up to a value of n which may exceed 12. In the latter case, the amplifier 42 may be omitted, the level of the signal obtained at the output 5 of the simulator being comparable to the level of the echo signal obtained during a real range measurement.

What is claimed is:

1. A delay simulator for a FM-CW range measuring apparatus, said apparatus effecting, during real time operation, a frequency comparison between a transmitted wave and a wave received after reflection from a target or retransmission by a responder, in such manner as to generate a beat signal Fb at the frequency fb, said simulator being intended for connection to said apparatus for testing its proper operation, characterized in that it comprises, arranged between a transmission portion and a receiving portion, a signal processing link including a first interruptor for very high frequencies, a circulator and a second interruptor for very high frequencies, said link further including:

(a) a delay line electrically connected to the circulator and operating in the reflecting mode for delaying the wave at a given frequency by a time equal to $\tau$; and (b) control means for said interruptors effecting opening thereof at a frequency fr at least equal to 2fb, the first interruptor being opened during a time interval $\delta$ distinctly less than 1fr, and the second interruptor being opened during a time interval $\delta'$, the phase shift of the predetermined operations between the two interruptors corresponding to a controllable time interval $\tau'$ between the beginning of the time intervals $\delta$ and $\delta'$, said interval $\tau'$ being such that the time intervals $\delta$ and $\delta'$ are separated and that at least an echo of the order P of the delay line is defined by the equation:

$$p \cdot \tau = k/fr + \tau'$$

where k is a small integer.

2. A delay simulator as claimed in claim 1, characterized in that said delay line operates at an intermediate frequency fi on the order of 1 GHz and that first and second mixers for very high frequencies are interposed in said signal processing link between the first interruptor and the circulator and between the circulator and the second interruptor, respectively, the first mixer receiving in the subtractive mode a signal Fos originating from an oscillator producing a frequency fos such that: fe−fos=fi and the second mixer receiving in the additive mode the signal Fos originating from said oscillator in such a manner as to recover at its output a signal of the frequency fi+fos=fe.

3. A delay simulator as claimed in claim 1 or 2, characterized in that amplifier means is provided just upstream of said second interruptor.

4. A delay simulator as claimed in claim 1 or 2, characterized in that for operating frequencies on the order of 1 GHz, the delay line is adapted to transmit a number of identifiable echoes of not more than n, which enables the simulation of a maximum of n different delays separated by $\tau$ or a multiple of $\tau$, where the following relations are satisfied:

$$f_r = \frac{k \pm \frac{u}{n+1}}{\tau}$$

$$\delta \leq \frac{\tau}{k(n+1) \pm u}$$

$$\tau' = \frac{\tau \cdot i}{k(n+1) + u}$$

in which relations:
k is an integer such as $k/\tau > 2fb$
u is an integer dividing n
i is an integer which may assume the values 1, 2, 3, . . . n for a given couple of values k and u.

* * * * *